July 15, 1952 S. E. HILBLOM 2,603,502
SHORT TURNING HITCH
Filed July 16, 1946 2 SHEETS—SHEET 2

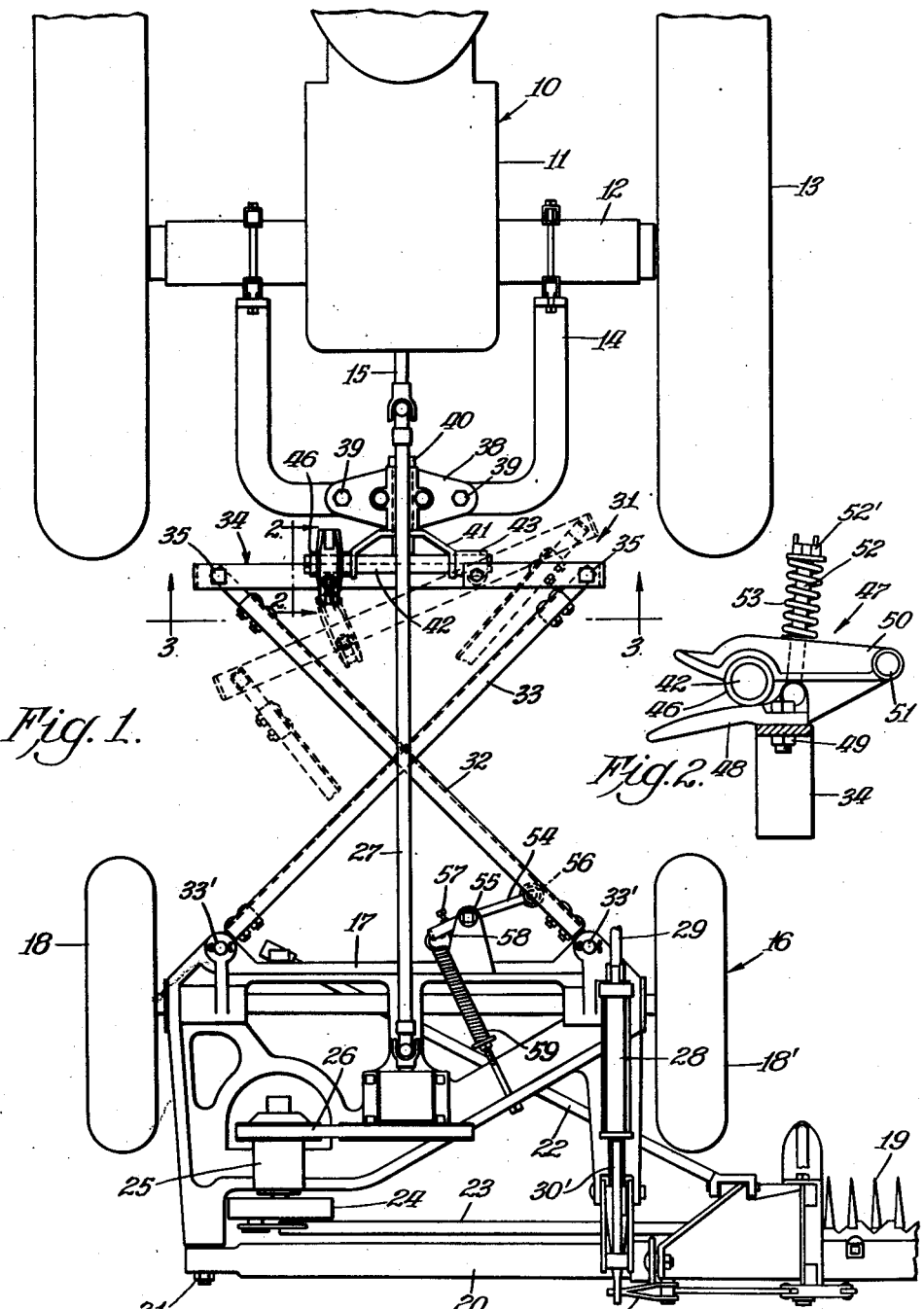

Inventor:
Samuel E. Hilblom
By
Paul O. Pippel
Atty.

Patented July 15, 1952

2,603,502

UNITED STATES PATENT OFFICE 2,603,502

SHORT TURNING HITCH

Samuel E. Hilblom, Chicago, Ill., assignor to International Harvester Company, a corporation of New Jersey Application July 16, 1946, Serial No. 683,877

3 Claims. (Cl. 280—33.5)

This invention relates to a tractor drawn agricultural implement, and particularly to a trailing mower adapted to be drawn by a tractor. More specifically, it relates to a hitch means for coupling a trailing mower to a tractor.

Users of tractor-drawn trailing mowers are familiar with the difficulties experienced with the operation of various hitch and coupling means that have been designed in the past. During the mowing of fields of vegetation a set pattern of operation is generally followed. This pattern consists of cutting a path of vegetation approximately the width of a mower cutter bar along the edge of the field until the end is reached. Upon reaching the end of the field it is then desired to cut a succeeding path at approximately a right angle to the first path cut. The same cutting procedure is followed at each corner until the field is completely mowed. In order to procure efficient operation and a consistent depth of cut, it is desirable that the corners of the field are cut as near a right angle, or squarely, as possible. This will facilitate the succeeding cut and will make it unnecessary for the operator to run back and forth over partially or irregularly cut portions. Hitches previously used have not functioned adequately to bring about the square and regular cutting of the corners. To bring about a square cut it is necessary for the mower cutting bar to approach the field at a right angle with respect to the previously cut path. In view of the limited area of most fields, and the available space for maneuvering the tractor, it is necessary to make an extremely short turn at the end of the field. With the conventional type hitch, a short turn could be made, but the cutter-bar would remain at an angular position and would not approach the field in a proper manner. As a result the corner would be jagged and the subsequent path to be cut would be equally uneven. The only other alternative for the operator would be to turn his tractor to the left and with it make a 360° turn, taking special care that on his approach to the field the cutter bar would be positioned at an angle of 90° with respect to the previously cut path. This latter procedure is, of course, time consuming, requires a large field, and is uncertain at best.

It is the prime object of this invention, therefore, to provide a trailing mower which is coupled to a tractor by an improved hitch means which will permit short turning of the mower at the end of the field so that the cutter bar of the mower will be in a position to cut a swath at approximately a right angle with respect to the first swath cut.

Another object is to provide an improved hitch means for a trailing mower, said hitch means permitting short turning of the mower with respect to the tractor without any substantial side skidding of the wheels of the mower.

Another object is to provide a cross-link hitch for a tractor drawn mower, said hitch being pivotal about a longitudinal and a transverse axis with respect to the draw-bar of a tractor.

Another object is to provide a cross-link hitch means for coupling a trailing mower to a tractor, said hitch means including a tension release means operable to release the frame of the mower from operating connection upon the cutter bar striking an obstruction.

Another object is to provide a stabilizing means for controlling the angular movement of a mower which is connected to a tractor by means of a pair of diagonal cross members.

A still further object is to provide a hitch means for coupling a trailing mower to a tractor, said hitch means comprising a spring tension release member engageable with a portion of the draw-bar and releasable therefrom upon the mower bar striking an obstruction.

Other objects and advantages will become more readily apparent upon reading the following description in conjunction with the accompanying drawings in which:

Fig. 1 is a plan view of a tractor drawn mower indicating the hitch means for coupling the same to a tractor;

Fig. 2 is a sectional view taken along the line 2—2 of Fig. 1 showing a tension release means for a tractor drawn mower;

Figure 4:
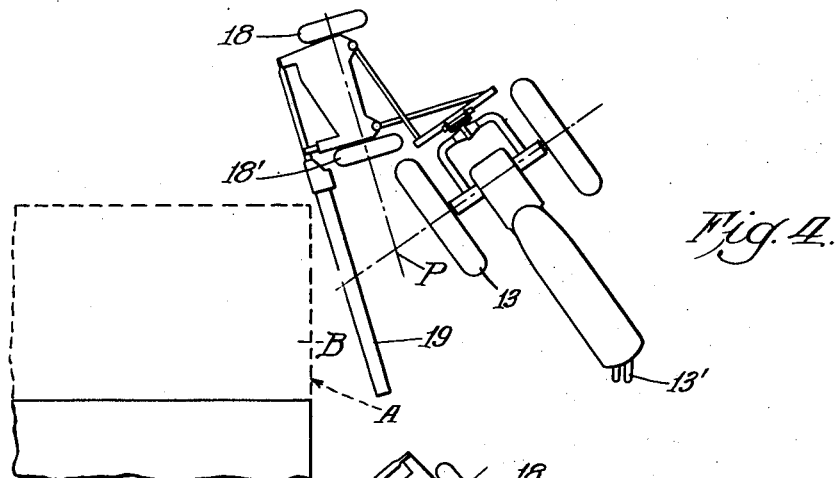
Fig. 4 is a diagrammatic plan view of a tractor drawn mower and its coupling means therefor, showing the position of the equipment as the mower is being turned upon reaching the end of a field to be cut.
Figure 5:
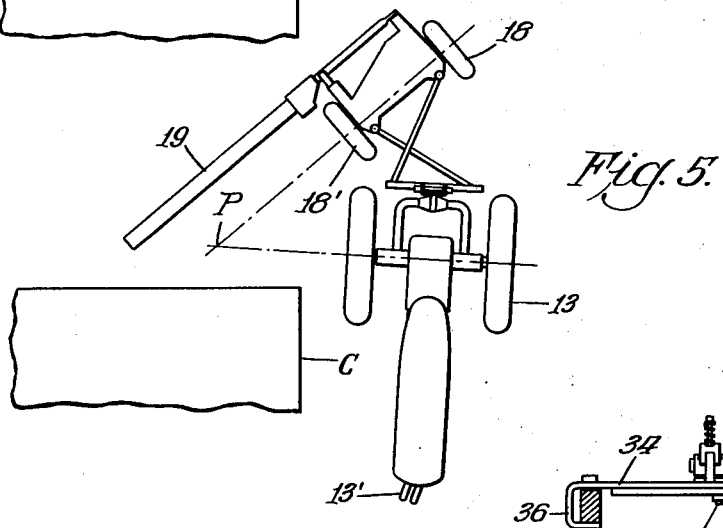
Fig. 5 is a diagrammatic plan view similar to Fig. 4 showing the position of the equipment during an intermediate certain stage of turning.
Figure 6:
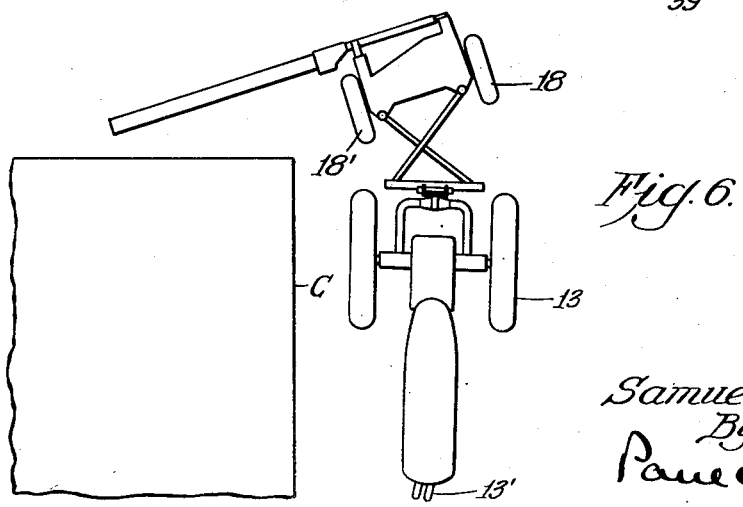
Fig. 6 is a diagrammatic plan view similar to Figs. 4 and 5 showing the position of the equipment in the last stages of a turn made at the end of the field.

Referring particularly to Figure 1, a tractor is generally designated by the reference character 10, and includes a longitudinal body portion 11 which is carried on a rear axle structure 12 suitably mounted on rear traction wheels 13. As indicated in Figs. 4, 5 and 6, the forward portion of the longitudinal body 11 is suitably carried by front ground supports 13. A draw-bar structure 14 is rigidly secured to the axle structure 12 and extends rearwardly therefrom. A power take-off shaft 15 extends rearwardly from the longitudinal body portion 11. A trailing mower generally designated by the reference character 16, is positioned rearwardly of the tractor. The mower 16 includes a mower frame 17 suitably mounted on transverse rear ground wheels 18 and 18'. Suitably connected to and extending from the frame 17 is a cutter or mower bar 19. A floating support 20 is pivotally mounted as indicated at 21 to the frame 17, and is connected to the cutter bar 19 to permit vertical movement of said bar. A diagonal member 22 further aids to carry the cutter bar 19 on the frame 17.

The trailing mower 16 also includes the usual pitman arm 23 which actuates the cutter bar 19. The pitman arm 23 is actuated by a crank wheel 24 journaled in a housing 25 mounted on the mower frame 17. The crank wheel 24 is rotated by means of a belt drive 26 which is actuated by a telescoping shaft extension 27 suitably connected to the power take-off shaft 15 for universal movement. The type of telescoping shaft extension shown is conventional in the art and is well illustrated in applicant's Patent 2,314,216 for "Control Means for Agricultural Implements," patented March 16, 1943.

A hydraulic cylinder 28 is mounted on the mower frame 17. The hydraulic cylinder includes a conduit 29, only a portion of which is shown. This conduit is generally in communication with a hydraulic unit mounted on and actuated by the tractor in the usual manner. A linkage means 30 is in communication with a piston 30' and the mower bar 19 to permit raising of the mower bar as desired.

Figure 3:
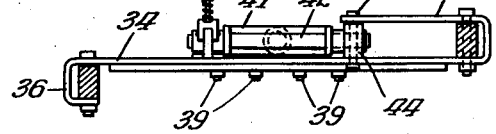
Fig. 3 is a view in elevation taken along the line 3—3 of Fig. 1 showing a portion of a tractor draw-bar and hitch means therefor.

A hitch or coupling means for connecting the frame 17 to the draw-bar 14 is generally indicated by the reference character 31. The hitch 31 includes a pair of diagonal cross-members 32 and 33 preferably, of channel section, connected to the mower frame by means of pins 33' for pivotal movement about a pair of spaced transverse axes. A transversely extending member 34 is positioned immediately aft of the draw-bar structure 14. The diagonal cross-members 32 are connected to the transversely extending member 34 by means of bolts 35 and are thus pivotal on said member about a pair of spaced vertical axes. The transverse member 34 includes, as best shown in Fig. 3, a downwardly and inwardly bent portion 36 and an upwardly and inwardly bent portion 37.

A bracket 38 is rigidly secured to the draw-bar structure 14 by means of bolts 39. A longitudinally extending shaft 40 is journaled for pivotal movement about the longitudinal axis of the bracket 38. A bail member 41 is rigidly secured to the shaft 40. The bail member 41 includes a transverse shaft 42 which is pivotal about a transverse axis of the bail member 41. A collar 43 is journaled on one end of the shaft 42, said collar having a vertical bearing member 44 connected thereto. The transverse member 34 and its upwardly and inwardly extending portion 37 is secured for pivotal movement about a vertical axis of the bearing member 44 by means of a pin or bolt 45. The other end of the shaft 42 extends laterally of the bail member 41 and has journaled thereon a collar 46. Both the collars 43 and 46 are held on the shaft 42 by means of cotter pins or other fastening means.

A tension release member is generally indicated by the reference character 47 and includes a lower jaw 48 rigidly secured to the transverse member 34 by means of bolts 49. A jaw 50 is mounted for pivotal movement with respect to the lower jaw 48 by means of a pin 51. As best indicated in Fig. 2, the lower jaw 48 and the upper jaw 50 securely grip the collar 46 and are resiliently clamped about the same by means of a pin 52 which is connected to the lower jaw 48 and slidably extends through the upper jaw 50. A spring 53 encircles the pin 52 and bears against the upper jaw member 50. An adjusting nut 52' suitably threaded on the pin 52 is provided for adjusting the tension of the spring 53.

In order to stabilize the frame of the mower during all types of cutting conditions, there is provided a crank-arm 54 which is pivotally connected to a portion of the frame as indicated at 55. A roller 56 is pivotally connected to the crank-arm 54 and is adapted to ride against the cross member 32. The crank-arm 54 includes an adjusting screw 57 adapted to engage a stop 58. A spring 59 urges the roller 56 in a counterclockwise direction and against the stop 58.

The general operation of the mower is readily apparent to one skilled in the art and need not be described. The operation of the hitch or coupling means is of prime importance and can best be seen from Figs. 4, 5 and 6. The letter A generally indicates a field of vegetation. B indicates a portion of the field or path which has been cut and C indicates the uncut portion of the field. As can be seen from Fig. 4, a portion of the field A has been cut and it is now desired to rotate the mower and the cutter bar so that the cutter bar will begin cutting a path through a portion of the field as indicated at B and at a right angle with respect to the cut path A. In order to secure the advantages of having the field corner cut squarely, it is desired to turn the mower and cutter bar in as small a space as possible and without excessive manipulation of the tractor. This is generally necessary because of the limited space of the field upon making the initial cut.

In turning, the operator pivots the tractor about the vertical axis of the wheel within the direction of the turn. Comparatively little forward movement of this inside wheel is effected at this point. As the tractor pivots about this vertical axis of the wheel, the mower frame in turn also pivots by virtue of the cross-link arrangement. Pivotal movement of the mower frame is initially effected about the vertical axis of the mower ground wheel 18. Comparatively little fore and aft movement of the ground wheel 18 is effected whereas the ground wheel 18' swings in a semi-circle. As can be seen in Figure 4 and indicated by the letter P, a line running through the transverse ground wheels 18 and 18' intersect a line running through the transverse wheels of the tractor at a point substantially close and adjacent to the longitudinal body of the tractor. The tractor is able to turn within a very short radius necessitating very little room turning space. Because of the novel cross-link arrangement of the coupling hitch, the short turning motion of the tractor is transmitted to the mower with negligible side thrust on the ground wheels 18 and 18'.

In order to complete the turn, the tractor moves forward and the mower thereupon rotates about the vertical axis of the ground wheel 18'. The wheel 18 is simultaneously rolled forward in a semi-circle and the frame 17 approaches the uncut field in the proper position. From this operation it can be seen that this turning movement of the mower is almost instantaneous, the cutter bar progressively assuming the positions indicated in Figs. 4, 5 and 6. As will be noted in Figure 6, forward movement of the tractor will straighten out the cutter bar and the cutter bar is now in position parallel to the field C to be cut, and at a right angle with respect to the previously cut path A.

It should now be apparent that the turning of the mower, and the positioning of the cutter bar in the desired position for producing a square cut, has been accomplished within a relatively small area. The desired result, therefore, has been achieved with a minimum amount of effort and within a small space. In view of the novel hitch means and its apparent operation, side skidding of the ground wheels is largely prevented.

Should the cutter bar encounter an obstruction during its travel through the field, the mower can readily be released from operating connection with the tractor. The tension means 47 is properly adjusted so that the jaws 48 and 50 will part upon a predetermined draft tension upon the transverse member 34. Should the mower bar 19 encounter an obstruction, the jaws 48 and 50 will become released from the collar 46, and the transverse member thereupon is free to pivot about the pin 45 as best indicated in Fig. 1. Release of the transverse member 34 will permit the frame of the mower to rotate about the vertical axis of the ground wheel 18, so that the cutter bar is assured against possible damage. The release means is of prime importance to prevent lateral thrust upon the ground wheels and possible skidding thereof when the cutter bar strikes an obstruction. Lateral skidding of the ground wheels would be ineffective to prevent damage to the mower. Thus by use of the release means, the mower is released from operating communication before such lateral skidding can take place. Since fields of different density may be cut, and since variable conditions are encountered in the same field, it is desirable to provide a stabilizing means to compensate for the additional thrust on the frame due to dense vegetation. Conditions of this type would tend to angle the frame and cause side skidding of the ground wheels thereby causing irregular cutting.

The stabilizing crank arm 54 is normally held against the stop 58 by means of the spring 59. The roller 56 is in running engagement with the cross member 32. As the cutter-bar of the mower cuts through the field and encounters particularly dense vegetation, there is a tendency, as a result of this increased thrust, for the mower frame to pivot or side skid. This in turn causes angular movement of the cross member 32, the angle between the cross member 32 and the frame 17 tending to grow smaller. At this point, the roller 56 and spring 59 take effect to prevent continued angular movement of the cross member 32 so that the cutter bar and frame are held in the proper cutting position. In other words, the stabilizing mechanism operates to hold the frame and cutter bar in the proper operating position at all times. Side thrust on the cross members 32 and 33, tending to move them, is resisted by the resilient action of the stabilizing means. The amount of resistence exerted by the stabilizer can be adjusted by means of the adjusting screw 57.

It should now be understood that a novel hitch means for a trailing mower has been provided which fully accomplishes the objects of the invention. It must be realized that various modifications may be made without departing from the spirit of the invention as disclosed nor as defined in the appended claims.

What is claimed is:

1. A hitch structure for holding a tractor and trailer vehicle in substantially longitudinal alignment while transmitting a pulling force from the tractor to the trailer, comprising a hitch frame including diagonal tension members adapted to be pivotally connected to the trailing vehicle at respectively opposite sides for pivotal movement about vertical axes, the tension members extending between the tractor and the trailer in crossed relation, a supporting member extending transversely with respect to said tension members, means pivotally connecting said tension members to said supporting member for pivotal movement about transversely spaced vertical axes, pivotal means adapted to connect said transverse member to the tractor whereby the transverse member may be pivoted about longitudinal and vertical axes, and means adapted to releasably connect said supporting member and one of said tension members to said tractor, said releasable means being responsive to an inordinate force transmitted through one of said diagonal tension members when the trailing vehicle encounters an obstruction.

2. A hitch structure for connecting a trailing implement to a tractor having a drawbar structure, comprising a pair of diagonal tension members adapted to pivotally connect to the trailing implement at respectively opposite sides for relative pivotal movement about vertical axes, said diagonal tension members extending longitudinally in crossed relation, a supporting member extending transversely with respect to said diagonal members, said diagonal members being pivotally connected to said transverse supporting member for pivotal movement about vertical axes, a first pivotal connection connected to said supporting member, said first pivotal connection being adapted to connect the transverse member to the drawbar of a tractor and providing for pivotal movement of said transverse member about a transverse axis, and a second pivotal connection connected to said transverse member and adapted to connect to the drawbar structure of a tractor to provide for pivotal movement of said transverse member about a longitudinal axis with respect to the drawbar structure of a tractor.

3. A hitch structure for connecting a trailing implement to a tractor having a drawbar structure, comprising a pair of diagonal tension members adapted to be pivotally connected to the trailing implement at transversely spaced opposite sides for pivotal movement about vertical axes, the diagonal tension members extending across one another to respectively opposite sides of the tractor, a transverse supporting member adjacent the drawbar structure, means pivotally connecting the diagonal tension members to the transverse supporting member at respectively opposite sides for pivotal movement about vertical axes, and a pivotal means including a bracket connection adapted to connect the transverse supporting member to the drawbar structure for pivotal movement about a longitudinal axis.

SAMUEL E. HILBLOM.

REFERENCES CITED

The following references are of record in the file of this patent:

UNITED STATES PATENTS

| Number | Name | Date |
|---|---|---|
| 1,077,262 | Dove | Nov. 4, 1913 |
| 1,167,122 | Simmons | Jan. 4, 1916 |
| 1,365,376 | Caswell | Jan. 11, 1921 |
| 1,419,433 | Wilson et al. | June 13, 1922 |
| 1,436,199 | Rutten et al. | Nov. 21, 1922 |
| 1,758,951 | Johnson | May 20, 1930 |
| 1,906,606 | Hyman | May 2, 1933 |
| 1,939,830 | Paul | Dec. 19, 1933 |
| 1,952,565 | Rednour | Mar. 27, 1934 |
| 1,967,326 | Raney | July 24, 1934 |
| 2,065,901 | Leavitt | Dec. 29, 1936 |
| 2,124,947 | Henderson | July 26, 1938 |
| 2,166,942 | Crumb et al. | July 25, 1939 |
| 2,292,362 | Coultas | Aug. 11, 1942 |
| 2,311,859 | Oehler | Feb. 23, 1943 |
| 2,384,363 | Bingham | Sept. 4, 1945 |